(12) United States Patent
Nor

(10) Patent No.: US 7,408,594 B2
(45) Date of Patent: Aug. 5, 2008

(54) ELECTRONIC SWITCH FOR TV SIGNAL BOOSTER

(75) Inventor: Azhar Bin Mohd Sidek Nor, Selangor (MY)

(73) Assignee: Sony EMCS (Malaysia) SDN.BHD., Kuala Lumpur (MY)

( * ) Notice: Subject to any disclaimer, the term of this patent is extended or adjusted under 35 U.S.C. 154(b) by 589 days.

(21) Appl. No.: 11/176,505

(22) Filed: Jul. 7, 2005

(65) Prior Publication Data
US 2006/0009179 A1    Jan. 12, 2006

(30) Foreign Application Priority Data
Jul. 8, 2004 (MY) ............... PI 2004 2730

(51) Int. Cl.
*H04N 5/50* (2006.01)
(52) U.S. Cl. ............ 348/731; 348/725; 455/226.1; 455/232.1
(58) Field of Classification Search .......... 348/731, 348/725, 707, 192; 455/134, 135, 194.1, 455/194.2, 341, 193.1, 226.1, 226.2, 226.3, 455/232.1
See application file for complete search history.

(56) References Cited

U.S. PATENT DOCUMENTS

| | | | | |
|---|---|---|---|---|
| 5,940,748 A * | 8/1999 | Daughtry et al. | .......... | 455/182.2 |
| 6,831,705 B2 * | 12/2004 | Yamamoto | .................. | 348/731 |
| 7,116,165 B2 * | 10/2006 | Kwong | ........................ | 330/129 |
| 7,185,242 B2 * | 2/2007 | Chun | ........................ | 714/704 |
| 7,277,684 B2 * | 10/2007 | Kushima et al. | .......... | 455/232.1 |
| 2003/0034838 A1 * | 2/2003 | Fanous et al. | ................ | 330/129 |
| 2004/0029537 A1 * | 2/2004 | Pugel et al. | .............. | 455/115.1 |
| 2004/0259516 A1 * | 12/2004 | Hwang et al. | ............. | 455/234.1 |
| 2006/0141965 A1 * | 6/2006 | Hennig | ..................... | 455/247.1 |
| 2007/0147553 A1 * | 6/2007 | Bhat et al. | .................. | 375/345 |

\* cited by examiner

*Primary Examiner*—M. Lee
(74) *Attorney, Agent, or Firm*—Frommer Lawrence & Haug LLP; William S. Frommer

(57) ABSTRACT

A method of automatically switching on/off a low noise amplifier that serves to boost weak video signals in a TV tuner (2). The method involves determining whether there is a signal present in the reception, and if so, whether the signal requires boosting. Thereafter, the method determines whether the booster has caused an overall improvement in the reception and accordingly maintains the booster amplifier switched on or switches it off.

12 Claims, 2 Drawing Sheets

ELECTRONIC SWITCH FOR TV SIGNAL BOOSTER

TECHNICAL FIELD

The present invention generally relates to TV tuners, and more particularly, to controlling a signal booster in a TV tuner.

BACKGROUND ART

Television broadcasts are transmitted using high frequency RF carriers. These high frequency carriers are easily deflected, reflected and blocked by obstructions such as concrete walls of buildings, trees and mountains. As such, the strength of television broadcast signals varies greatly from one area to another. The quality of the reception of a given television station depends on many factors, including the location of the television receiver, the position of the television receiver, the quality and type (indoor or outdoor) of the receiving antenna used and the quality of the antenna cable used. The shielding effect of the antenna cable used will also have a substantial effect on the quality of a received television signal.

Generally, in an area where the signal of a particular television station is very weak, the use of a television signal booster (RF amplifier) to increase the signal strength for that particular television station is very favourable. However, as signal strengths from other television stations are often already more than sufficient, it may be necessary to turn the television signal booster off when the television receiver is receiving program from a television station with a strong signal. Otherwise, the received RF signal will be over-amplified, causing the signal to saturate in the receiver's amplifier, adding more noise to the original signal.

If a television station broadcasts at a frequency sandwiched between two stronger television stations, turning on the booster while receiving signal from that station may result in signals from the adjacent television stations being amplified, causing interference and adding noise to the original signal.

Conventional television receivers incorporating an internal television signal booster require the user to either switch on or off the booster manually, depending on the condition of a received television signal. This will become a nuisance when the user has several or many television stations to choose from, as every television station will have its own particular signal strength, and a substantial number of television stations may be broadcasting at frequencies very close to each other. Moreover, the lay user cannot be expected to understand that the booster can worsen his TV picture if it is switched on when not required.

Japanese patent application publication 2001-244836 discloses reducing interference due to beat noise components, by lowering the gain of the high frequency amplification during channel search. This is achieved by lowering the AGC signal feedback to the RF amplifier during automatic channel search.

Japanese utility model H05-20472 teaches disabling the operation of the RF amplifier during channel preset, to avoid cross modulation and hum modulation.

Japanese patent application publication H05-304640 discloses bypassing an RF amplifier when the AGC voltage satisfies a predetermined voltage.

Japanese utility model S58-138465 discloses turning an RF signal booster on or off depending on the strength of the input signal.

SUMMARY OF INVENTION

The principal aim of the invention is thus to provide a method and apparatus that save a TV viewer the inconvenience and complication associated with having to manually switch on and off a signal booster function in the TV, so that an optimum signal can be had whatever the signal strength of a chosen station.

According to one aspect of the present invention, there is provided a method of automatically switching on/off a low noise amplifier (LNA) that serves to boost weak video signals in a TV tuner, the method comprising:
  (a) determining whether a tuned-in signal meets predetermined minimum criteria for picture reproduction;
  (b) if the determination in step (a) is negative, switching off said LNA;
  (c) if the determination in step (a) is positive, determining whether said tuned-in signal requires boosting;
  (d) if the determination in step (c) is negative, switching off said LNA;
  (e) if the determination in step (c) is positive, switching on said LNA;
  (f) measuring a change in signal-to-noise ratio of the LNA-amplified tuned-in signal after switching on said LNA in step (e), and
  (g) if said measured change in step (f) is an increase and exceeds a predetermined threshold, maintaining said LNA in a switched-on state, and otherwise switching off said LNA.

The above method is performed automatically every time the TV is switched on and every time the tuned channel is changed.

Thus, the invention allows the booster amplifier (LNA) to be switched on or off automatically without required user intervention. Such electronic switching determines whether a received television signal requires signal boosting, and then switches the signal booster to either on or off, allowing a television receiver to deliver the best possible received picture to the user.

Especially, the present invention determines whether switching on a booster amplifier gives an improvement in signal-to-noise ration in the tuned-in signal. Therefore, simply turning on the booster amplifier based on AGC voltage or noise level alone, as in the above prior art is avoided. In contrast, in accordance with the present invention, picture deterioration due to increased interference from strong signals in neighbouring channels can be eliminated or at least reduced.

In one embodiment, step (c) comprises determining whether an AGC feedback voltage to said TV tuner exceeds a first threshold, as a means of determining whether the TV signal needs boosting.

In another embodiment of the present invention, step (c) comprises determining whether a signal-to-noise level of said tuned-in signal is below a second threshold, as a means of determining whether the TV signal needs boosting.

Preferably, step (c) comprises determining whether an AGC feedback voltage to said TV tuner exceeds a first threshold and, if so, whether a signal-to-noise level of said tuned-in signal is below a second threshold.

According to one preferred feature, the above method further comprises delaying a release of picture blanking, pending the completion of step (g). This avoids any sudden flashes or changes to the picture quality that may be disturbing to the viewer.

According to another aspect of the present invention, there is provided an electronic control for automatically switching on/off a low noise amplifier (LNA) that serves to boost weak video signals in a TV tuner, comprising:

input means for receiving first and second input data;

processing means receiving said data from the input means;

output means for outputting a control signal to switch on or off said LNA;

wherein the processing means:

(a) determines from said first data whether a tuned-in signal meets predetermined minimum criteria for picture reproduction;

(b) switches off said LNA, if the determination in step (a) is negative;

(c) determines from said second data whether said tuned-in signal requires boosting, if the determination in step (a) is positive;

(d) switches off said LNA, if the determination in step (c) is negative;

(e) switches on said LNA, if the determination in step (c) is positive;

(f) measures a change exhibited by said second data in signal-to-noise ratio of the LNA-amplified tuned-in signal after switching on said LNA in step (e), and (g) if said measured change in step (f) is an increase and exceeds a predetermined threshold, generating said control signal at said output means to maintain said LNA in a switched-on state, and otherwise generating said control signal at said output means to switch off said LNA.

In an electronic control according to one embodiment of the present invention, the second input data comprises data representing AGC feedback voltage to said TV tuner and step (c) comprises determining whether the second input data is exceeds a first threshold.

In an electronic control according to another embodiment of the present invention, the second input data comprises data representing a signal-to-noise level of said tuned-in signal and step (c) comprises determining whether the second input data is below a second threshold.

In an electronic control according to a preferred embodiment of the present invention, the second input data comprises data representing AGC feedback voltage to said TV tuner and data representing a signal-to-noise level of said tuned-in signal, and step (c) comprises determining whether said AGC feedback voltage to said TV tuner exceeds a first threshold, if so, whether said signal-to-noise level of said tuned-in signal is below a second threshold.

The first input data may represent the presence of video sync pulses and/or the detection of chrominance signal, as a means for determining that there is a signal capable of being boosted.

In a further aspect of the present invention, there is provided a television comprising a TV tuner with an electronic control, as described above, for automatically switching on/off a low noise amplifier (LNA) that serves to boost weak signals in said TV tuner.

An advantage of the present invention is that all the above determinations can be made based on data already available within a television. A further advantage is that the necessary data processing can be done in an existing integrated circuit such as a so-called Ultimate-One-Chip (UOC) by simple programming of its ROM memory. The Ultimate-One-Chip belongs to a family of signal processors available from Philips Semiconductors of Eindhoven, The Netherlands. The processors are multi-system (PAL/NTSC/SECAM) TV processor chips developed by Philips, that incorporate a programmable microcontroller, text and sound decoding support and on screen display functions. A single UOC is able to perform functions of many separate components in an analogue television and the functions of these integrated components are controlled by the microcontroller. Thus, the electronic switch of the invention can be implemented in such a chip on the television's main printed circuit board (PCB) without any increase in component count.

BRIEF DESCRIPTION OF THE DRAWINGS

The invention is illustrated, but not limited, by the following description of preferred embodiments, that is given by way of example only with reference to the accompanying drawings, in which.

DESCRIPTION OF THE PREFERRED EMBODIMENTS

Figure 1:
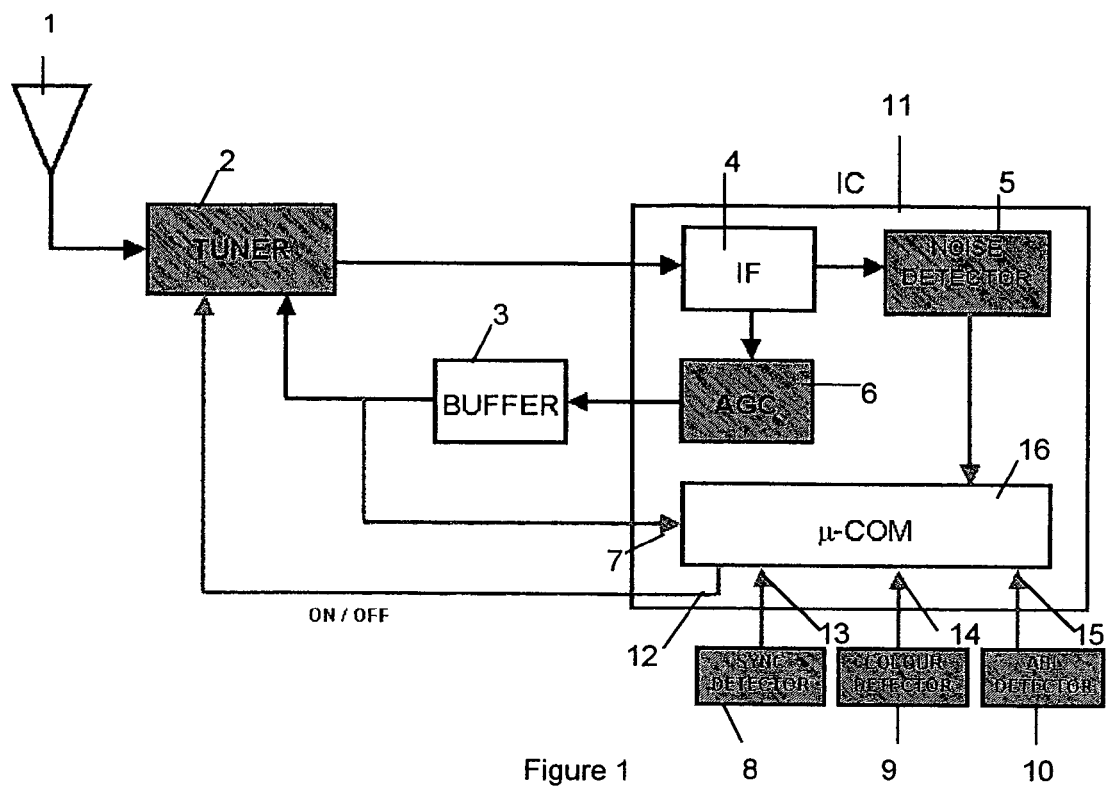
FIG. 1 is a block diagram of a television tuner circuit incorporating an amplified tuner and an Ultimate One Chip (UOC).

Referring to FIG. 1, a television tuner circuit consists of a tuner 2 and an Ultimate One Chip (UOC) 11. The UOC is suitably a Philips TDA 12067 family TV processor chip. In this embodiment, the tuner 2 incorporates an integral LNA (booster amplifier)(not shown), that can be selectively switched on or off according to a control signal from the output means 12.

When the television is switched on, television signals are picked off the air by the antenna 1. The signals are downconverted to an IF frequency such as 38 MHz by the tuner 2 and enter the UOC 11.

Following initial preset channel set-up and once a desired station has been chosen for viewing, the microcontroller 7 in the UOC 11 initiates the signal booster program to on and determines (in FIG. 2, Step 22) if the user has set the signal booster function to "auto". If it is set to "off", the microcontroller 7 switches to, or maintains the booster in, the disabled condition and then releases picture blanking (Step 32). The microcontroller achieves this by sending a control signal from the output means 12 to the tuner 2.

If the signal booster function is set to "auto", the program proceeds to determine if the received television signal meets the minimum requirements. The program does this by checking (Step 23) detection of video sync pulses. The program continues to check for detection of chrominance (Step 24) and the ABL (picture blanking) level (Step 25).

If any of the above conditions are not met, the microcontroller 7 turns off the booster (Step 33) by sending a control signal from the output means 12 to the tuner 2 and then releases picture blanking (Step 32).

Should the microcontroller 7 determine that all the minimum requirements needed to generate a viewable television signal are met, it proceeds to read the data from the Automatic Gain Control block (AGC) 6 through the buffer block 3 to determine if the AGC voltage has reached a predetermined threshold. The predetermined AGC voltage value (e.g. 2.5v) will be decided primarily by the general television broadcast power of a particular area. If the AGC voltage does not reach a minimum value, the signal booster program turns off the booster (Step 33) by sending a control signal from the output means 12 to the tuner 2 and then releases picture blanking (Step 32).

However, if the AGC threshold was met, the microcontroller 7 reads off data from the noise detector block 5, to determine (Step 28) if the signal-to-noise ratio of the image falls below a predetermined limit (e.g. 3 dB). A strong television transmission delivers clear stable picture with a high signal-to-noise ratio, whereas a weak television transmission delivers a noisy distorted picture with a low signal-to-noise ratio.

If the signal-to-noise ratio falls below that predetermined limit, the microcontroller 7 turns the booster to on (Step 29). Otherwise, the microcontroller 7 turns the booster to off (Step 33) by sending a control signal from the output means 12 to the tuner 2 and then releases picture blanking (Step 32).

At the next step, the signal booster program determines if the picture blanking duration has finished. The picture blanking duration is initiated by another program (not shown). If the picture blanking duration has reached its end, the signal booster program adds 301 a further interval, that is an integral multiple of 10 millisecond, such as 300 millisecond to that duration and waits for a picture blanking release command.

The microcontroller 7 proceeds to extract the boosted television signal and the signal booster program compares (Step 31) the extracted signal's signal-to-noise ratio with that of the original signal. If there is an improvement, i.e. increase, in terms of signal-to-noise ratio, and that improvement meets a minimum threshold (e.g. 1 dB), the program keeps the booster turned on. Otherwise, it directs the microcontroller 7 to turn the booster amplifier to off (Step 33) by sending a control signal from the output means 12 to the tuner 2.

The program reaches the final step and releases the picture blanking (Step 32), and an image appears on the television screen. The whole process is repeated each time the user switches the television channel.

The values of the various thresholds mentioned are determined empirically and set in the factory according to the end market conditions, and can be later changed by service engineers (if necessary).

As used in this specification, terms such as "switching off" the LNA will be understood to refer to either turning off such amplifier if it is currently on and maintaining it off if it is already off. Terms such as "switching on" will be construed in like manner.

Figure 2:
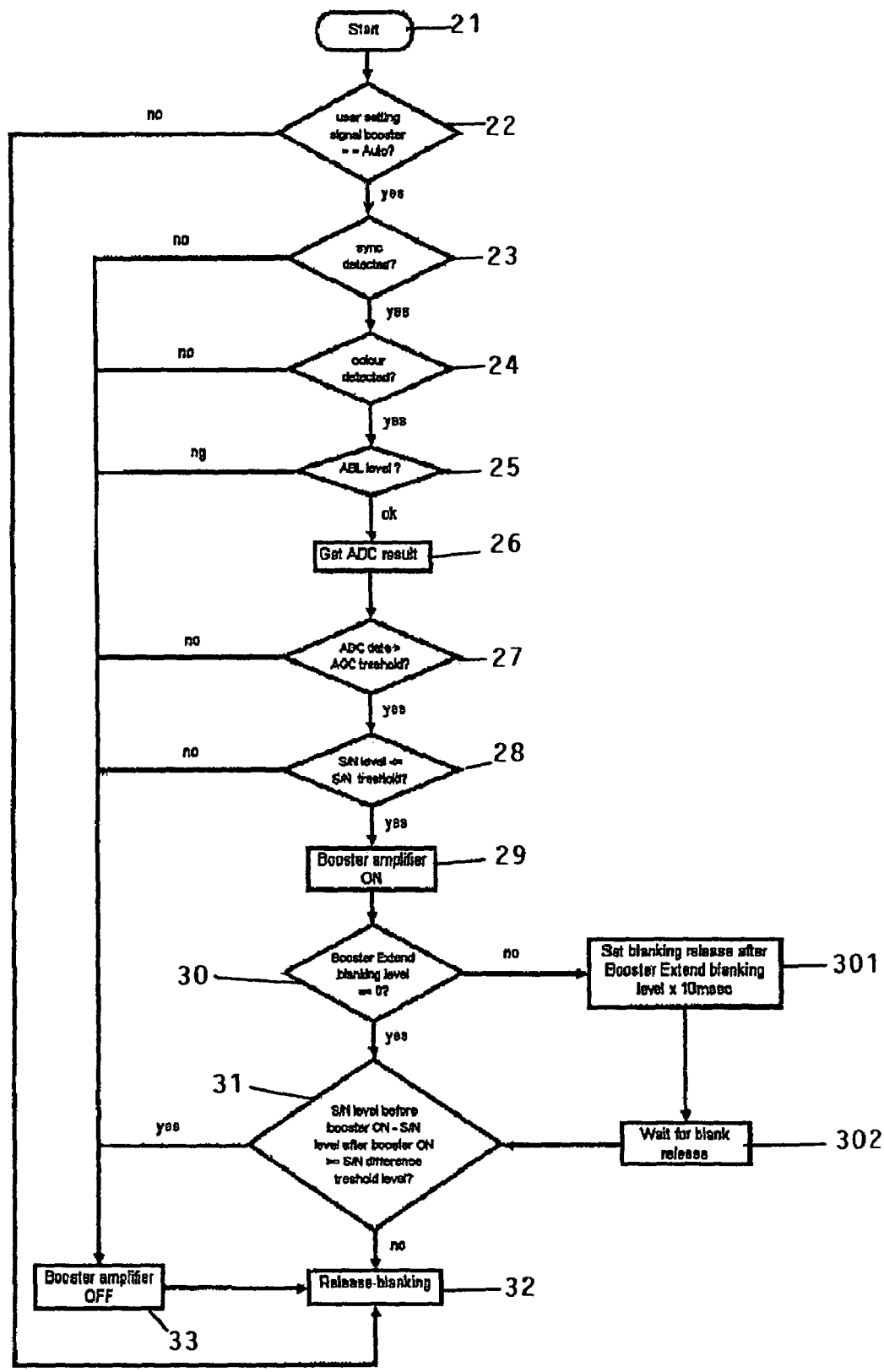
FIG. 2 is a flowchart illustrating the steps of a program used to determine whether the signal booster should be turned on or off.

Implementation of the necessary programming of microcontroller 16 as per the flowchart of FIG. 2, is within the competence of a person of ordinary skill in the art and so does not require further elaboration.

It is understood that the invention may be embodied in numerous other ways without departing from the scope of the invention.

The invention claimed is:

1. A method of automatically switching on/off a low noise amplifier (LNA) that serves to boost weak video signals in a TV tuner (2), the method comprising:
  (a) determining (23, 24, 25) whether a tuned-in signal meets predetermined minimum criteria for picture reproduction;
  (b) if the determination in step (a) is negative, switching off said LNA (33);
  (c) if the determination in step (a) is positive, determining (27, 28) whether said tuned-in signal requires boosting;
  (d) if the determination in step (c) is negative, switching off said LNA (33);
  (e) if the determination in step (c) is positive, switching on said LNA (29);
  (f) measuring a change in signal-to-noise ratio of the LNA-amplified tuned-in signal after switching on said LNA in step (e), and
  (g) if said measured change in step (f) is an increase and exceeds a predetermined threshold (31), maintaining said LNA in a switched-on state, and otherwise switching off said LNA (33).

2. A method according to claim 1, wherein step (c) comprises determining (27) whether an AGC feedback voltage to said TV tuner (2) exceeds a first threshold.

3. A method according to claim 1, wherein step (c) comprises determining (28) whether a signal-to-noise level of said tuned-in signal is below a second threshold.

4. A method according to claim 1, wherein step (c) comprises determining (27) whether an AGC feedback voltage to said TV tuner (2) exceeds a first threshold and, if so, whether (28) a signal-to-noise level of said tuned-in signal is below a second threshold.

5. A method according to claim 1, further comprising:
  (h) delaying (30, 301, 302) a release of picture blanking (32), pending the completion of step (g).

6. An electronic control for automatically switching on/off a low noise amplifier (LNA) that serves to boost weak video signals in a TV tuner (2), comprising:
  input means (13, 14, 15, 16, 17) for receiving first and second input data;
  processing means (7) receiving said data from the input means (13, 14, 15, 16, 17);
  output means (12) for outputting a control signal to enable or disable said LNA;
  wherein the processing means:
  (a) determines from said first data whether a tuned-in signal meets predetermined minimum criteria for picture reproduction;
  (b) switches off said LNA, if the determination in step (a) is negative;
  (c) determines from said second data (16, 17) whether said tuned-in signal requires boosting, if the determination in step (a) is positive;
  (d) switches off said LNA, if the determination in step (c) is negative;
  (e) switches on said LNA, if the determination in step (c) is positive;
  (f) measures a change exhibited by said second data (16) in signal-to-noise ratio of the LNA-amplified tuned-in signal after switching on said LNA in step (e), and
  (g) if said measured change in step (f) is an increase and exceeds a predetermined threshold, generating said control signal at said output means (12) to maintain said LNA in a switched-on state, and otherwise generating said control signal at said output means (12) to switch off said LNA.

7. An electronic control according to claim 6, wherein the second input data (16, 17) comprises data representing AGC feedback voltage to said TV tuner (2) and step (c) comprises determining whether the second input data (17) exceeds a first threshold.

8. An electronic control according to claim 6, wherein the second input data (16) comprises data representing a signal-to-noise level of said tuned-in signal and step (c) comprises determining whether the second input data is below a second threshold.

9. An electronic control according to claim 6, wherein the second input data (16, 17) comprises data representing AGC feedback voltage to said TV tuner and data representing a signal-to-noise level of said tuned-in signal, and step (c) comprises determining whether said AGC feedback voltage exceeds a first threshold and, if so, whether said signal-to-noise level of said tuned-in signal is below a second threshold.

10. An electronic control as claimed in claim 6 wherein the first input data (13) represents the presence of video sync pulses.

11. An electronic control as claimed in claim 6 wherein the first input data (14) represents the detection of chrominance signal.

12. A TV comprising a TV tuner with an electronic control for automatically switching on/off a low noise amplifier (LNA) that serves to boost weak signals in said TV tuner (2) as claimed in claim 6.

* * * * *